United States Patent
Honnappa et al.

(10) Patent No.: US 10,931,583 B2
(45) Date of Patent: Feb. 23, 2021

(54) METHODS OF LOAD BALANCING

(71) Applicants: Purdue Research Foundation, West Lafayette, IN (US); The Regents of the University of Michigan, Ann Arbor, MI (US)

(72) Inventors: Harsha Honnappa, West Lafayette, IN (US); Vijay Subramanian, Ann Arbor, MI (US)

(73) Assignees: Purdue Research Foundation, West Lafayette, IN (US); The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 16/593,719

(22) Filed: Oct. 4, 2019

(65) Prior Publication Data

US 2020/0112511 A1 Apr. 9, 2020

Related U.S. Application Data

(60) Provisional application No. 62/741,514, filed on Oct. 4, 2018.

(51) Int. Cl.
*H04L 12/803* (2013.01)
*G06F 9/50* (2006.01)
(Continued)

(52) U.S. Cl.
CPC .......... *H04L 47/125* (2013.01); *G06F 9/5072* (2013.01); *H04L 47/17* (2013.01); *H04L 47/6255* (2013.01); *H04L 47/726* (2013.01)

(58) Field of Classification Search
CPC ...... H04L 47/125; H04L 47/17; H04L 47/726; H04L 47/6255; H04L 49/50; H04L 47/625; G06F 9/5072; G06F 9/5083
(Continued)

(56) References Cited

U.S. PATENT DOCUMENTS

| | | | | |
|---|---|---|---|---|
| 9,225,730 B1* | 12/2015 | Brezinski | ............... | G06F 21/00 |
| 2013/0308444 A1* | 11/2013 | Sem-Jacobsen | ........ | H04L 45/02 |
| | | | | 370/230 |
| 2019/0155926 A1* | 5/2019 | Scheideler | ............ | G06F 16/215 |

OTHER PUBLICATIONS

Mitzenmacher et al., The power of two random choices: A survey of techniques and results, Combinatorial Optimization, vol. 9, pp. 255-304, 2001.
(Continued)

*Primary Examiner* — Tu T Nguyen
(74) *Attorney, Agent, or Firm* — Piroozi-IP, LLC

(57) ABSTRACT

A load balancing method is disclosed, the method includes establishing a processing network including a plurality of task-processing processors interconnected therewith, each processor of the plurality having a queue of tasks to be processed, establishing a k-regular graph including nodes and branches connecting the nodes, where k is the degree of the graph, assigning d walkers to the k-regular graph, where each walker is randomly assigned to a node, receiving a new task to be processed, walking from the assigned nodes to new nodes by randomly choosing a new node from one or more available nodes, without backtracking from each of the assigned nodes to a node from which each of the d walkers immediately walked, comparing the queues of the new nodes, determining which queue of the new nodes has the least number of tasks; and assigning the new task to the node with the least number of tasks.

15 Claims, 9 Drawing Sheets

(51) Int. Cl.
  *H04L 12/801* (2013.01)
  *H04L 12/911* (2013.01)
  *H04L 12/863* (2013.01)

(58) Field of Classification Search
  USPC ........................................................ 709/203
  See application file for complete search history.

(56) References Cited

OTHER PUBLICATIONS

Hoory et al., Expander graphs and their applications, Bulletin of the American Mathematical Society, vol. 43, No. 4, pp. 439-561, 2006.
Hiajek et al., The missing piece syndrome in peer-to-peer communication, Stochastic Systems, vol. 1, No. 2, pp. 246-273, 2011.
Chung et al., Concentration inequalities and martingale inequalities: a survey, Internet Mathematics, vol. 3, No. I: 79-127, 2006.
Vvedenskaya et al., Queueing System with Selection of the Shortest of Two Queues: An Asymptotic Approach. 1996.
Gardner et al., The Power of d Choices for Redundancy, Article submitted to Operations Research, 2017.
Vocking et al., How asymmetry helps load balancing. Journal of the ACM (JACM), 50(4):568-589, 2003.
Azar et al., Balanced allocations. SIAM journal on computing, 29(1):180-200, 1999.
Alon et al., Non-backtracking random walks mix faster. Communications in Contemporary Mathematics, 9(04):585503, 2007.

\* cited by examiner

METHODS OF LOAD BALANCING

CROSS-REFERENCE TO RELATED APPLICATIONS

The present patent application is related to and claims the priority benefit of U.S. Provisional Patent Application Ser. No. 62/741,514 filed Oct. 4, 2018, the contents of which are hereby incorporated by reference in its entirety into the present disclosure.

STATEMENT REGARDING GOVERNMENT FUNDING

This invention was not made with government support.

TECHNICAL FIELD

The present disclosure generally relates to load balancing, and in particular, to methods of load balancing of task processing.

BACKGROUND

This section introduces aspects that may help facilitate a better understanding of the disclosure. Accordingly, these statements are to be read in this light and are not to be understood as admissions about what is or is not prior art.

Cloud computing is now ubiquitous. Server farms formed in pluralities span multiple locations and each may have hundreds of servers available for performing computing tasks. All in all, in certain situations, thousands of servers may be interconnected and ready for accepting a new computing task. One or more centralized task allocators are responsible for allocating new incoming computing tasks amongst these servers. A key bottleneck in the engineering and optimal operation of such large-scale systems is the efficient utilization of the available resources, computing or memory in this context. To accomplish this allocation, an efficient load-balancing is needed.

Such a load balancing solutions have been the topic of recent investigations, whether in cloud computing or other situations in which a new task is to be assigned amongst a large number of task-processing nodes. Existing load-balancing methodology has focused on two extremes and methods in between these two extremes. These two extremes are (i) completely deterministic algorithms such as the Join-the-Shortest-Queue (JSQ) method whereby the state of every single node is assumed to be known to a centralized dispatcher at all points in time, or (ii) a complete random selection of the server for assignment of the next incoming task. In between these are other randomized algorithms that use minimal state information, such as the power-of-d choices (SQ(D)) algorithm whereby the centralized dispatcher only has localized state information. The JSQ approach is however impractical given the amount of information and thus overhead that the large number of servers (e.g., thousands or even millions) would have to communicate with the central scheduler. This matter is further complicated by the fact that the number of jobs in each queue does not translate to the amount of processing time those jobs will require. For example, while a first queue may have N jobs in the queue and a second queue may have M jobs in its queue where N is much higher than M, due to the processing time required by the jobs in the second queue, the second queue (M is less than N), would not have been the proper choice. Although, statistically speaking, the Shortest Queue approach may provide the best result, notwithstanding the issue of overhead.

Another approach may be to randomly choose a server and assign that server to the new task. This approach establishes the other end of the spectrum as compared to JSQ. While this method has the least amount of overhead, statistically, it would be associated with the worst load balancing outcome.

Yet another approach, called the power-of-d choices SQ(D), is somewhere in between the two ends of the aforementioned spectrum, where if there are n servers, D random servers are chosen to accomplish the task. However, there is a rather large drop-off in efficiency between the Shortest Queue and the power-of-d choices approach. Note that increasing the degree of randomness by increasing D will increase the computation and communication requirements of the load-balancing algorithm. These load-balancing methods were designed for smaller scale web-farms and assume that queue lengths can be communicated to a centralized dispatcher on a critical path. This can be a costly overhead in a large scale-out distributed environment, wherein multiple dispatchers might be required for load balancing. A workaround to this either requires the dispatchers to store the identity of a few of the least loaded servers from the past few server samplings increasing the memory overhead, or asks the servers to preemptively communicate their emptiness to the dispatcher, increasing both the memory and communication overhead. Therefore, there is a significant gap in the development of distributed load-balancing algorithms that have low memory and communication requirements while also achieving high performance with less (or the 'right' degree of) randomness.

Therefore, there is an unmet need for a novel approach that can efficiently assign a new incoming task to a task processor that does not require significant overhead.

SUMMARY

A load balancing method is disclosed. The method includes establishing a processing network including a plurality of task-processing processors interconnected therewith. Each processor of the plurality has a queue of tasks to be processed. The method further includes establishing a k-regular graph including nodes and branches connecting the nodes. Each node represents a processor of the plurality of processor. Each node is connected to other nodes by k branches. k is the degree of the graph. k is at least one. The method also includes assigning d walkers to the k-regular graph. Each walker is randomly assigned to a node. d is at least 2. The method further includes receiving a new task to be processed by the processing network. Furthermore, the method includes walking from the assigned nodes to new nodes by randomly choosing a new node from one or more available nodes connected to the assigned nodes by the branches, without backtracking in one step from each of the assigned nodes to a node from which each of the d walkers immediately walked. The method also includes comparing the queues of the new nodes. Additionally, the method includes determining which queue of the new nodes has the least number of tasks. The method further includes assigning the new task to the node with the least number of tasks.

DETAILED DESCRIPTION

Figure 1A:
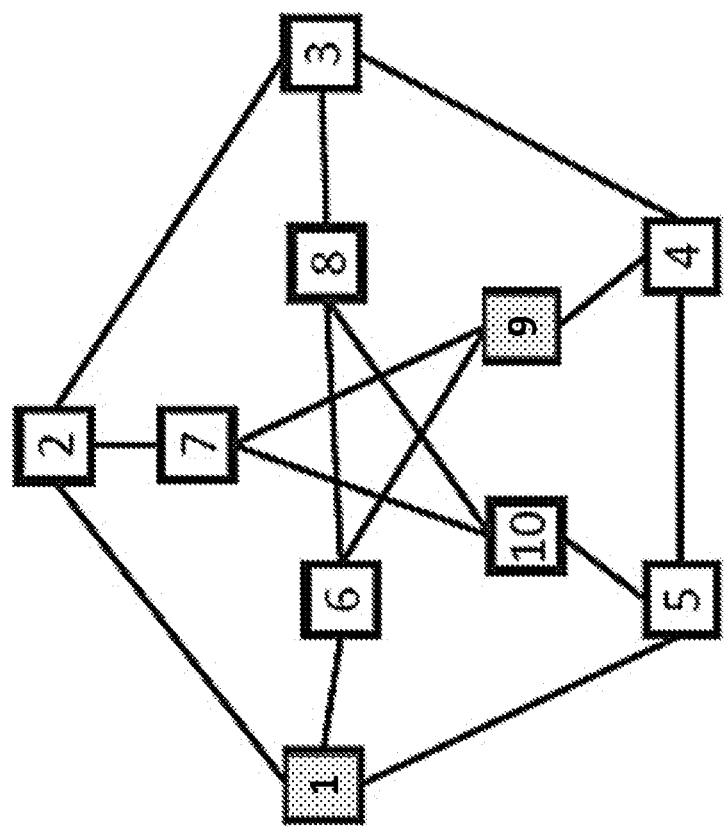
FIG. 1A is an exemplary k-graph of 10 nodes, according to the present disclosure, having a degree of 3.
Figure 1A:
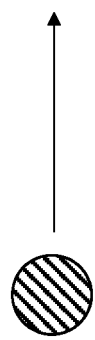

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel system of approaches is disclosed that can efficiently assign a new incoming task to a task processor that does not require significant overhead. The current solutions available in the prior art represent technical solutions using computer technologies. The present disclosure provides an improvement to this technical field in order to meet the aforementioned gap between the two primary approaches of the prior art based created by overhead on one extreme and complete randomness on the other. To this end, the present disclosure provides three different approaches to address the aforementioned goal. The first approach is based on d-parallel non-backtracking random walks (NBRWs) on a k-regular random graph. The second approach is based on a reversible non-uniform random-walk based on load-balancing algorithm family with node weights given by $w_q(Q_i(t))=\exp(-\alpha Q_i(t))$ for different values of $\alpha$, where $Q_i(t)$ represents the state of the node i, and $\alpha$ is a user defined constant. The state of the node refers to either the number of jobs waiting for service, or the total amount of time required to service all the jobs waiting, or some other measure of the value/cost of processing jobs. We will refer to $Q_i$ as the queue-length. The third approach is based on a non-reversible non-uniform random-walk based load-balancing algorithm including the case where the random walker is only allowed to choose between next-hop nodes that have the minimum state value. To understand these separate aspects, some definitions are initially offered.

The parameter d indicates the number of walkers on the graph with n nodes, where each node represents a server. The graphs are assumed to be k-regular graphs. A regular graph is one where all nodes have equal degrees, where each degree refers to a branch connecting one node to another. This means that from any one node (i.e., node), there are k possible paths from that node to other nodes. Such a graph is referred to as a k-regular graph. If one such node has a degree less than k, then that is not a regular graph.

For all the three distinct algorithms provided herein that use a random-walk, a non-backtracking random walk (NBRW) feature is enforced. This means that at any point on the k-regular graph a random walker may not go back to the node from which it immediately travelled. Furthermore, while not posing a limitation, for all these situations, the present disclosure assumes d and k to be 5 (as discussed above, d represents the number of random walkers and k represents the degree of the regular graph, i.e., the number of available branches connected to each node). A few important points stand out. It is apparent that sampling the servers uniformly using an NBRW yields a performance that is extremely close to SQ(D); however, the approach discussed herein uses less randomness to yield roughly the same performance as SQ(D). These new algorithms of the present disclosure outperform SQ(D) with the performance being dramatically better in terms of achieving a (stochastically) smaller queue-length distribution, even at heavy load factors such as $\rho=0.99$. Here, $\rho$ represents a measure of the throughput (or the number of jobs that can be processed per unit time while maintaining a finite number of waiting jobs on average) of a server system. The closer $\rho$ is to 1, the more jobs that can be processed per unit time, but the larger the number of waiting jobs (on average).

A k-regular random graph between the servers (with k≥3, e.g., 5) is used to propose the novel load balancing algorithms of the present disclosure that use a distributed memory/information structure. In this base scheme we will sample the servers to check for job assignment by using d independent NBRWs. As the graph is held fixed, for more general schemes we increase the information available for load-balancing by making each server communicate its queue-length to the neighbors in the random graph where a walker currently resides. Given the graph is a k-regular graph, each server is only going to receive k queue-length values. This communication can further be limited by communicating the information only when the queue-length changes. Thus, accordingly, the queue-lengths of the next-hop servers are known prior to making the hop. For the second and third algorithms of the present disclosure, this information is thus used for determining the next-hop of the random-walker as part of a weighting function $w_q$ (that is positive and non-increasing in the queue length), and dynamically bias the random-walker's next hop choice by making the walker choose the next-hop with a probability proportional to either the weight of the next-hop server or a combination of weights of current server and the next-hop server. We do this for all the d random-walkers, then compare the queue-lengths of the next hop servers to determine the identity of the least loaded sampled server to assign the job to.

In the k-regular graph for each node there are k edges (i.e., branches between that node and the other nodes). This is identified as edge (i, j), also referred to herein as branch, between nodes i and j. The nodes i,j (respectively) in the set (1 . . . n) have weights $w_q(i)$ and $w_q(j)$ (respectively) which are used to determine the edge weight $w_q(i)w_q(j)$ (for edge (i,j)) for the weighted random walk. We can generalize by setting the edge weights based on a symmetric function of the queue lengths of the two nodes $f_e$, and use that for the random walk. An example is p-means, where $f(q_1, q_2)=((w_q^p(q_1)+w_q^p(q_2))/2)^{1/p}$ for p>0 with $w_q(q_i) \equiv w_q(i)$ being the appropriate weight for queue-length $q_i$ for $i \in \{1, 2\}$; note that p=0 corresponds to the geometric mean, i.e., weight being $\sqrt{w_q(q1)w_q(q2)}$. We can generalize the family of load-balancing algorithms to include non-reversible random walks too, so that edge-weights depend on the queue-lengths of the endpoint nodes and the node where the walker currently resides. In this case, we can generalize by setting the edge weights based on an asymmetric function of the queue lengths of the two nodes $f_e$, and use that for the random walk. An example is weighted p-means, where $f(q_1, q_2)=((Z_1 w_q^p(q_1)+Z_2 w_q^p(q_2))/2)^{1/p}$ for p>0 with $w_q(q_i) \equiv w_q(i)$ being the appropriate weight for queue-length $q_i$ for $i \in \{1, 2\}$ and $Z_1+Z_2=1$ and $Z_1>0$ and $Z_2>0$; note that p=0 corresponds to the geometric mean, i.e., weight being $(w_q^{Z_1}(q_i)w_q^{Z_2}(q1))$.

Figure 1B:
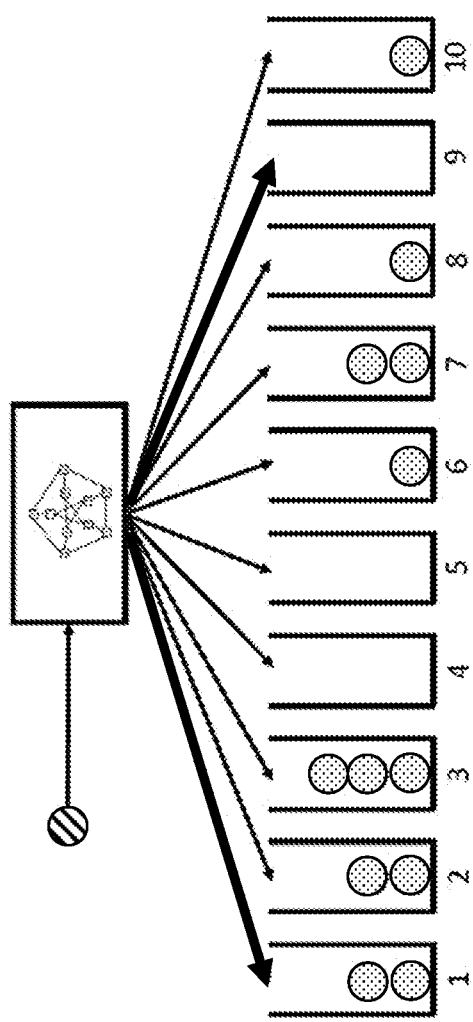
FIG. 1B is a schematic of plurality of bins each with 0 to a plurality of balls therein, and a new arriving ball.
Figure 2:
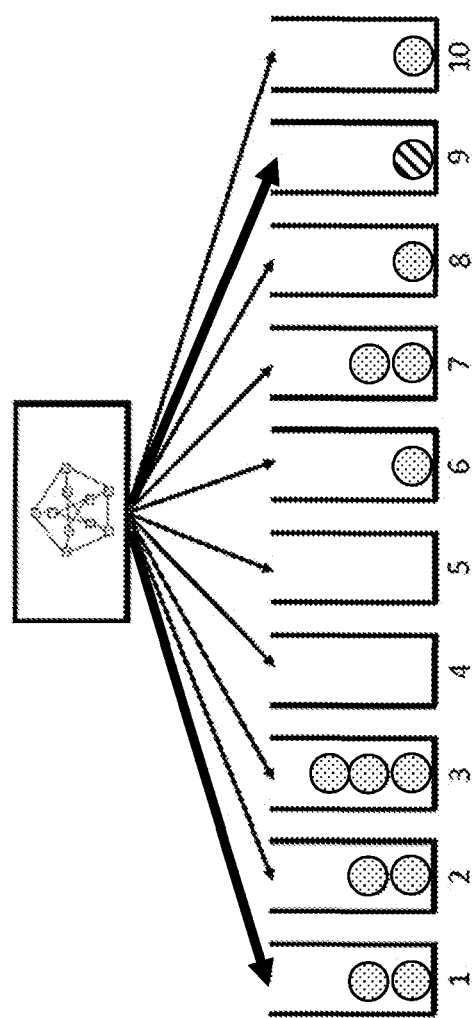
FIG. 2 is another schematic of the bins shown in FIG. 1B, with the new ball placed in a bin based on the decision making process of the present disclosure.

To better demonstrate the algorithms of the present disclosure an example is provided. Suppose m balls are to be placed into n bins, according to some dispatching policy, with each bin already including 0-1 balls in it already. As each of the m balls become available, with the goal being to uniformly populate the bins different methods can be applied. One approach, seen in the prior art, is to assign each ball into a bin uniformly at random. The choice of bin for each ball is independent of choice of placing another ball in the same or another bin. Under the Power of d choices (discussed above), the scheduler for each ball, samples d bins randomly, uniformly, and independently. The scheduler then places the next ball into the bin that is least loaded. Any ties between the bins are addressed according to some predetermined policy. While, the Power of d choices provides a much higher efficacy of generating uniformly loaded bins, the efficacy is still low. Next approach represents the methods of the present disclosure. At each time a ball becomes available, a k-regular graph is used in which each bin is represented by a node (1 . . . n), and each node has connectivity with other nodes by k branches. d walkers are dispatched to d randomly chosen bins, where no two bins are the same. $W_1[j], W_2[j], \ldots, W_d[j]$ are candidate bins for the jth ball. The jth ball as assigned to the least loaded bin between $W_1[j], W_2[j], \ldots, W_d[j]$. Here the k and d are fixed. The walkers are bound to non-backtracking random walks. An example of such a graph is shown in FIG. 1A, where n=10, d=2 walkers, and k=3. In FIG. 1A, as a new ball becomes available, a 3-regular graph is used with two walkers randomly assigned to two bins (i.e., bins 1 and 9). Each bin is connected to other bins via three connections. For example, bin 6 is connected to bins 9, 8, and 1. This allocation is shown in FIG. 1B, where bins 1, 2, and 7 each have two ball, bin 3 has three balls, bins 6, 8, and 10 each have only one ball, and bins 4, 5, and 9 are empty. Further, suppose the two walkers are randomly assigned bins 1 and 9 at the time the new ball becomes available. In FIG. 1B, the randomly assigned position of the walkers (i.e., bins 1 and 9) are highlighted with thickened line. According to one embodiment of the present disclosure, a comparison is made between these two bins and the new ball is placed in the bin with the least number of balls. This bin is 9 since bin 9 has no balls and bin 1 has 2 balls. This placement is shown in FIG. 2, where the new ball is placed in bin 9. Note that the new ball is shaded differently than existing balls in various bins.

Figure 3A:
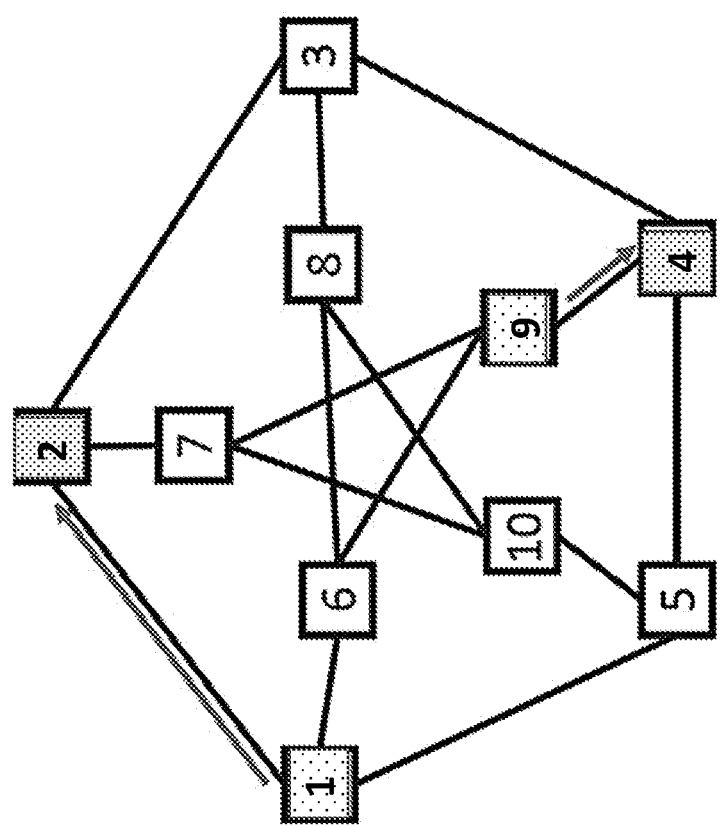
FIG. 3A is the k-graph of FIG. 1A, shown with two walkers progressing from initial nodes to new nodes, according to the decision making process of the present disclosure.
Figure 3B:
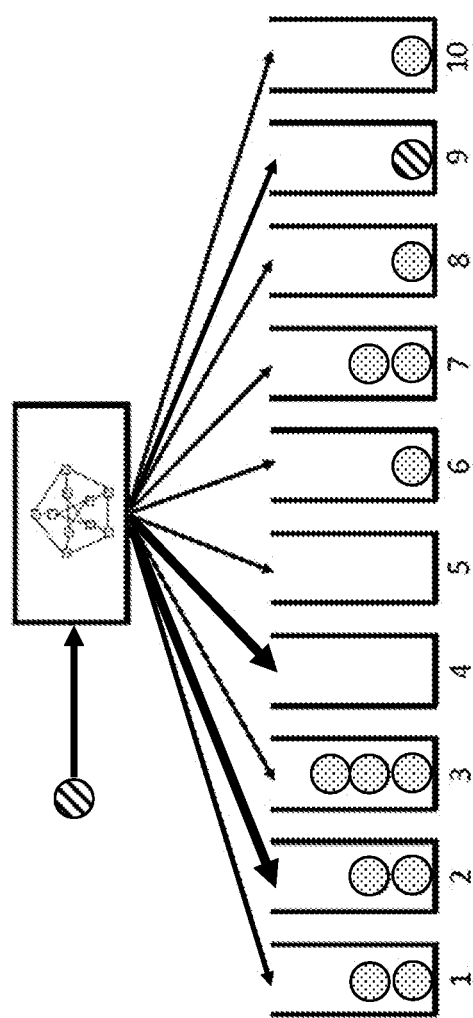
FIG. 3B is the schematic of FIG. 1B, showing the new arriving ball depicted in FIG. 3A, and its potential new placement bins, according to the present disclosure.
Figure 4:
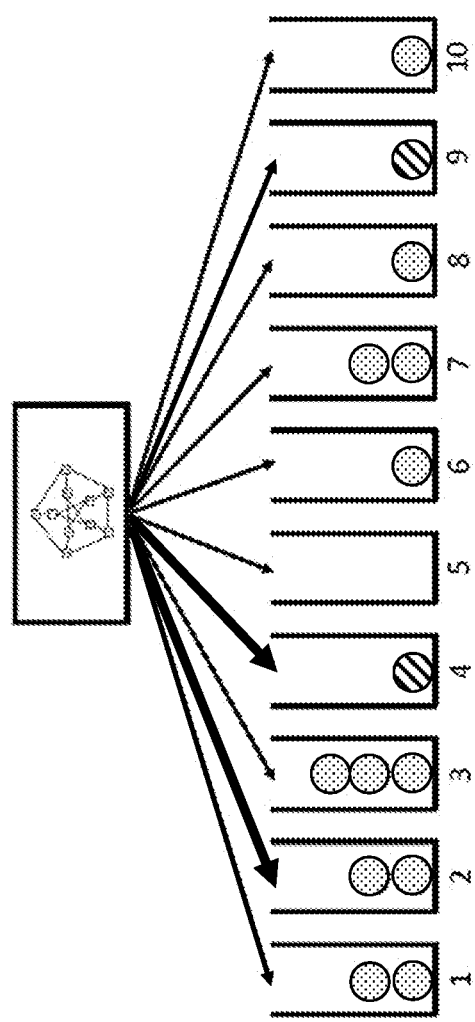
FIG. 4 is another schematic of the bins shown in FIG. 3B, with the new ball placed in a bin based on the decision making process of the present disclosure.

Next, as a new ball arrives, and referring to FIG. 3A, walkers are assigned new random bins. The random selection for bin 1 is based on three choices: 2, 5, and 6 (i.e., the bins to which bin 1 is connected). In this case, the random choice was bin 2. Similarly, the random choice for bin 9 is out of three choices: 4, 7, and 6. In this case, bin 4 was randomly chosen out of those choices. Thus, one walker walks from bin 1 to bin 2 and the other walker walks from bin 9 to bin 4, as indicated by the arrows. Since the walkers are not allowed to traverse back to where they immediately came from, bins 1 and 9 are highlighted. The new bins 2 and 4 are highlighted as well as immediately walked from bins of 1 and 9, respectively. Referring to FIG. 3B, the new bins (i.e., bins 2 and 4) are highlighted by thickened lines. According to one embodiment of the present disclosure, a comparison is made between these two bins and the new ball is placed in the bin with the least number of balls. This bin is 4 since bin 4 has no balls and bin 2 has 2 balls. This placement is shown in FIG. 4, where the new ball is placed in bin 4. Note that the new ball is shaded differently than existing balls in various bins.

Figure 5A:
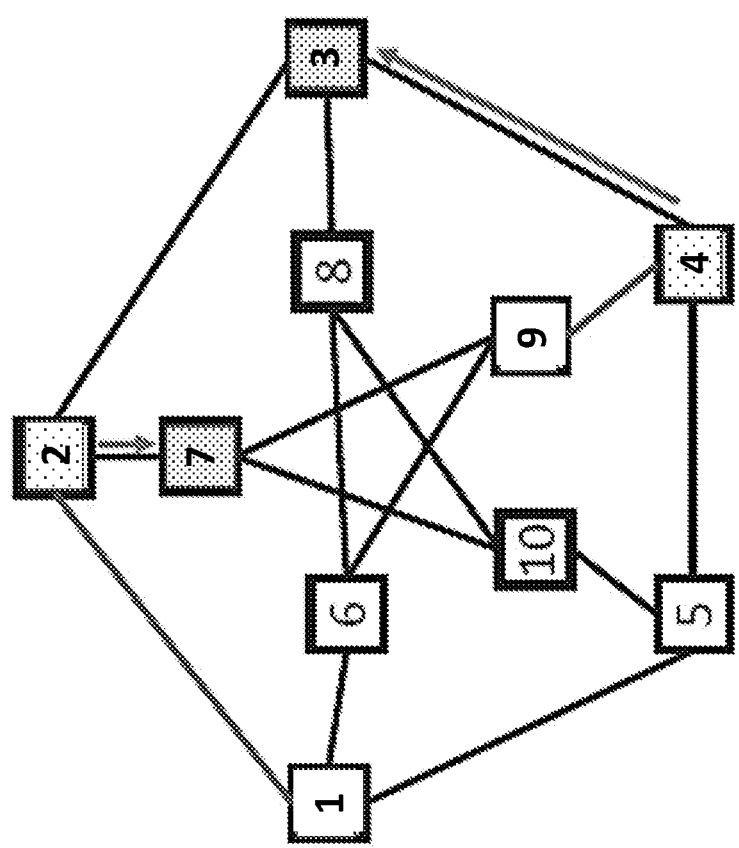
FIG. 5A is the k-graph of FIG. 3A, shown with two walkers progressing from nodes shown in FIG. 3A to new nodes, according to the decision making process of the present disclosure.
Figure 5B:
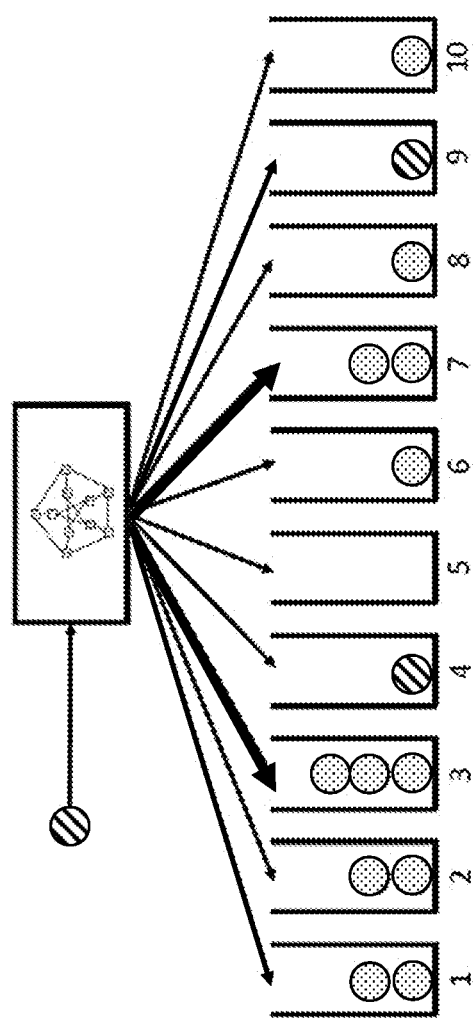
FIG. 5B is the schematic of FIG. 3B, showing the new arriving ball depicted in FIG. 5A, and its potential new placement bins, according to the present disclosure.
Figure 6:
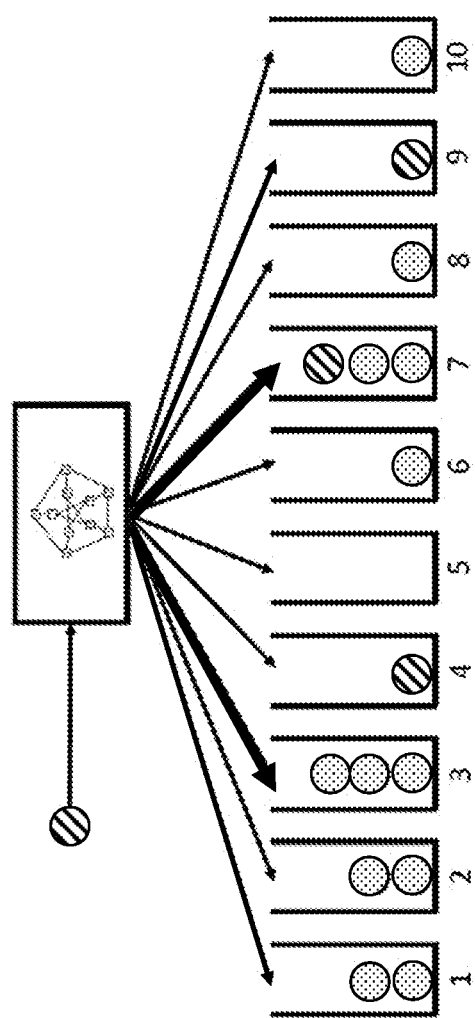
FIG. 6 is another schematic of the bins shown in FIG. 5B, with the new ball placed in a bin based on the decision making process of the present disclosure.

Next, as a new ball arrives and referring to FIG. 5A, walkers are assigned new random bins. The random selection for bin 2 is based on three choices: 7, 1, and 3 (i.e., the bins to which bin 2 is connected). However, bin 1 represents a bin from which the walker immediately walked in order to reach bin 2. Thus, bin 1 is not an available option. Thus, only bins 7 and 3 are available, from which bin 7 is chosen randomly for the walker to walk from bin 2. Similarly, the random choice for bin 4 is out of three choices: 9, 5, and 3. However, bin 9 represents a bin from which the walker immediately walked in order to reach bin 4. Thus, bin 9 is not an available option. Thus, only bins 5 and 3 are available, from which bin 3 is chosen randomly for the walker to walk from bin 4. In this case, bin 3 was randomly chosen out of those choices. Thus, one walker walks from bin 2 to bin 7 and the other walker walks from bin 4 to bin 3, as indicated by the arrows. The new bins 7 and 3 are highlighted as well as immediately walked from bins of 2 and 4, respectively. Bins 1 and 9 are again unhighlighted, which refers to a situation where the walker cannot go back to those nodes from which the walkers immediately walked; however, other approaches may define non-backtracking as incorporating prohibition of backtracking not just of the immediate nodes but a predetermined number of previously walked nodes. Referring to FIG. 5B, the new bins (i.e., bins 7 and 3) are highlighted by thickened lines. According to one embodiment of the present disclosure, a comparison is made between these two bins and the new ball is placed in the bin with the least number of balls. This bin is 7 since bin 7 has 2 balls and bin 3 has 3 balls. This placement is shown in FIG. 6, where the new ball is placed in bin 7. Note that the new ball is shaded differently than existing balls in various bins.

This process is repeated each time there is a new ball becomes available. Now suppose, upon arrival of a new ball, the walker at node 3 randomly chooses node 2. And suppose, going back to a recently visited node (e.g., node 2) results in a reset. In cases where the graphs have extreme large girths, a reset scheme may not be required, however, for smaller graphs, a reset scheme allows a similar statistical randomness as a large graph. Upon a reset, the walkers would be allowed to start at new random nodes and begin walking again. Resets can be triggered as a result of a plurality of events, including: 1) After some fixed number of arrival requests (i.e., new balls coming in or new tasks coming into a plurality of task-processing servers); 2) After some predetermined fixed time; and 3) After the first intersection event after the immediate past reset where the intersection event is defined as any of the random walkers revisiting past locations (after the immediate past reset) visited by any of the random walkers (including itself). In the latter, the past locations can be limited to an immediate past node, a node visited n nodes ago, or any of the past visited nodes. After a reset, each random walker picks a random location to restart the walk from. It is possible that the restart happens at a node that was visited recently in the past by one or more walkers or even that multiple walkers land up on the same node.

As discussed above, two other approaches are covered by the present disclosure, including 1) based on a reversible non-uniform random-walk based on load-balancing algorithm family with node weights; and 2) based on a non-reversible non-uniform random-walk based load-balancing algorithm with the random walker only allowed to choose between next-hop nodes that have the minimum state value. Assume that a walker is currently on node i and arrived there from node j. By the non-backtracking principle, the walker cannot immediately go back to node j but has a choice between the remaining k−1 nodes to which node i is connected (k-regular graph). These nodes are $j_1, j_2, j_{\{k-1\}}$. The second approach sets a weight $y_{\{j\_1\}}:=f(w_i, w_{\{j1\}})$ for node $j_1$, $y_{\{j\_1\}}:=f(w_i, w_{\{j2\}})$ for node $j_2, \ldots,$ and $y_{\{j(k-1)\}}:=f(w_i, w_{\{j(k-1)\}})$ for node k−1. Then the next destination node is chosen by choosing one of $j_1, j_2, j_{\{j(k-1)\}}$ by using the probability distribution $(y_{\{j\_1\}}/Y, y_{\{j2\}}/Y, \ldots, y_{\{j(k-1)\}}/Y)$ where $Y=y_{\{j1\}}+y\{j2\}+ \ldots +y_{\{j(k-1)\}}$. As f(.) is a symmetric function of its arguments we can use reversible version of the walk. In the third approach, we follow the same procedure but with weights $y_{\{j\_1\}}:=w_{\{j\_1\}}, y_{\{j\_2\}}:=w_{\{j2\}}, \ldots,$ and $y_{\{j(k-1)\}}:=w_{\{j(k-1)\}}$; as the weights do not depend on the weight of node i in a symmetric manner. This is an example of a non-reversible version of the walk. An extreme version of this is to pick one of the least loaded (smallest queue-length) nodes among $j_1, j_2, \ldots,$ and $j_{\{k\_1\}}$ and to send the walker there. Note that the first approach, discussed above, is a sub-case of both the second and the third approaches by taking setting $y_{\{j\_1\}}=y_{\{j\_2\}}= \ldots =y_{\{j(k-1)\}}=1$. Finally, as we are considering the choice of the walker to go from node i to node $j_1$, node i to node $j_2, \ldots,$ and node i to node $j_{\{k-1\}}$, we can also interpret $y_{\{j\_1\}}$ as the weight of the edge $(i,j_1)$, $y_{\{j2\}}$ as the weight of the edge $(i,j_2), \ldots,$ and $y_{\{j\{k-1\}\}}$ as the weight of the edge $(i,j_{\{k-1\}})$.

The non-reversible walkers are useful since they can better load-balance by being able to find empty or less loaded nodes faster than reversible walkers. However, it may not always be feasible to implement a non-reversible walker and therefore it should be left to the specific use case to decide what type of walker to use in practice.

Additional information is provided in the Appendixes of the present disclosure, filed herewith, and incorporated by reference in their entirety into the present disclosure.

Those having ordinary skill in the art will recognize that numerous modifications can be made to the specific implementations described above. The implementations should not be limited to the particular limitations described. Other implementations may be possible.

The invention claimed is:

1. A load balancing method, comprising:
   establishing a processing network including a plurality of task-processing processors interconnected therewith, each processor of the plurality having a queue of tasks to be processed;
   establishing a k-regular graph including nodes and branches connecting the nodes, where each node represents a processor of the plurality of processor, and each node is connected to other nodes by k branches, where k is the degree of the graph, and where k is at least one;
   assigning d walkers to the k-regular graph, where each walker is randomly assigned to a node, where d is at least 2;
   receiving a new task to be processed by the processing network;
   walking from the assigned nodes to new nodes by randomly choosing a new node from one or more available nodes connected to the assigned nodes by the branches, without backtracking in one step from each of the assigned nodes to a node from which each of the d walkers immediately walked;
   comparing the queues of the new nodes;
   determining which queue of the new nodes has the least number of tasks; and
   assigning the new task to the node with the least number of tasks.

2. The method of claim 1, wherein each node is assigned a weight.

3. The method of claim 2, wherein the new nodes are chosen based on weights of the assigned nodes.

4. The method of claim 3, wherein each of the nodes i,j, respectively, in the set of nodes (1 . . . n) have weights wq(i) and wq(j), respectively, whereby the random walks from node i to one of nodes $j_1, \ldots j_{k-1}$ is weighted and based on corresponding weights of the nodes $j_1, \ldots j_{k-1}$.

5. The method of claim 4, wherein each of the nodes i,j, respectively, in the set of nodes (1 . . . n) have weights $w_q(i)$ and $w_q(j)$, respectively, which establish branch weights $w_q(i)w_q(j)$ for branch (i,j) for the weighted random walk, and wherein the random walk is based on the branch weights.

6. The method of claim 5, wherein each branch weight is determined based on a symmetric function of the queue lengths of the two nodes defining a corresponding branch.

7. The method of claim 6, where the symmetric function is p-means, where $f(q_1, q_2)=((w_q^p(q_1)+w_q^p(q_2))/2)^{1/p}$ for p>0, with $w_q(q_i)$ being substantially the same as $w_q(i)$.

8. The method of claim 7, wherein a corresponding branch weight is defined by $\sqrt{w_q(q1)w_q(q2)}$.

9. The method of claim 3, wherein the new nodes are chosen based on a reversible non-uniform random-walk.

10. The method of claim 3, wherein the new nodes are chosen based on a non-reversible non-uniform random-walks.

11. The method of claim 10, wherein each of the nodes i,j, respectively, in the set of nodes (1 . . . n) have weights $w_q(i)$ and $w_q(j)$, respectively, which establish branch weights $w_q(i)w_q(j)$ for branch (i,j) for the weighted random walk, and wherein the random walk is based on the branch weights.

12. The method of claim 11, wherein each branch weight is determined based on an asymmetric function of the queue lengths of the two nodes defining a corresponding branch.

13. The method of claim 12, where the asymmetric function is weighted p-means, where $f(q_i, q_j) = ((Z_i w_q^p(q_i) + Z_j w_q^p(q_j))/2)^{1/p}$ for $p>0$ with $w_q(q_i) \equiv w_q(i)$ being substantially the same as $w_q(i)$ and $Z_i + Z_j = 1$ and $Z_i \geq 0$ and $Z_3 \geq 0$.

14. The method of claim 13, wherein a corresponding branch weight is defined by: $(w_q^{Z_i}(q_i) \times w_q^{Z_j}(q_j))$.

15. The method of claim 14, wherein $Z_i = 0$ and $Z_j = 1$ so that only the next-hop node weight is used as the branch weight.

* * * * *